Feb. 10, 1970 W. G. BOELKINS ET AL 3,494,181
SENSING ASSEMBLY
Filed Dec. 11, 1967 2 Sheets-Sheet 2
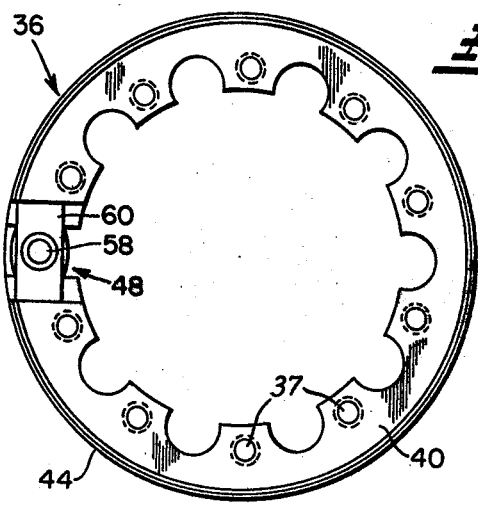
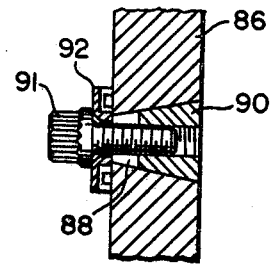
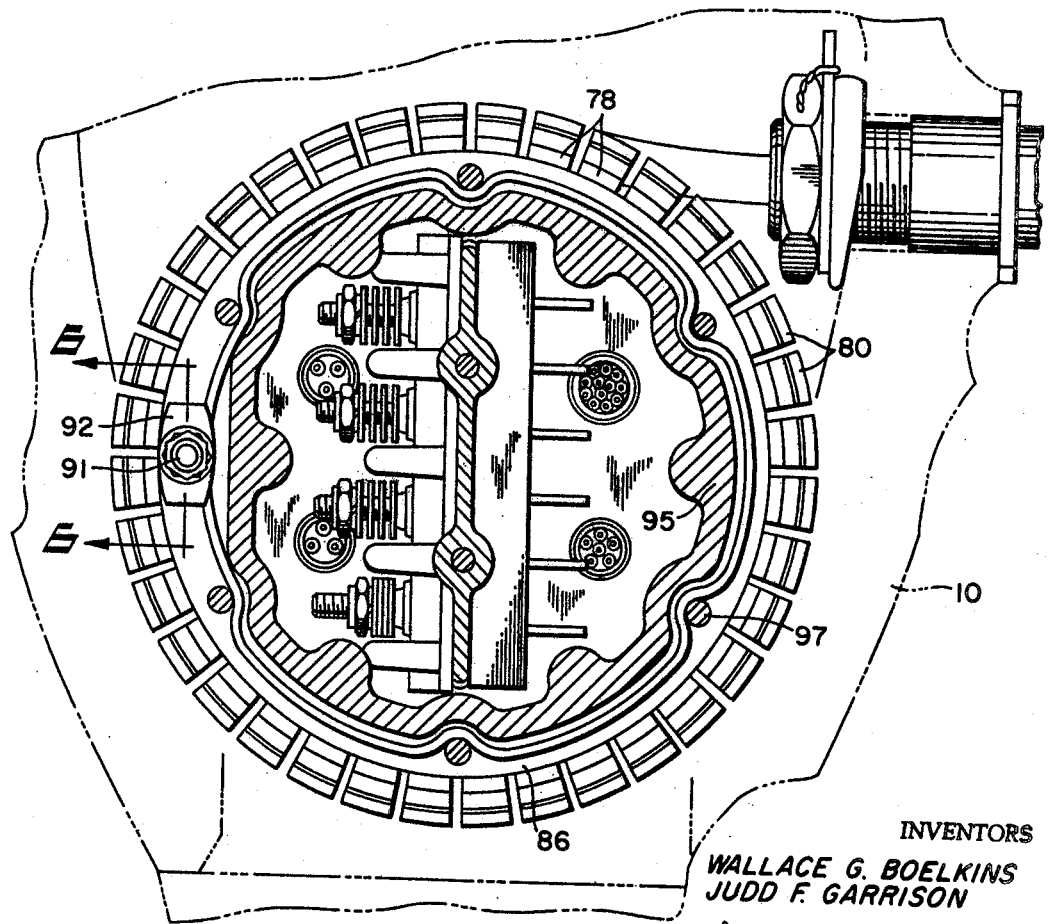
INVENTORS
WALLACE G. BOELKINS
JUDD F. GARRISON
BY
ATTORNEY

United States Patent Office 3,494,181
Patented Feb. 10, 1970

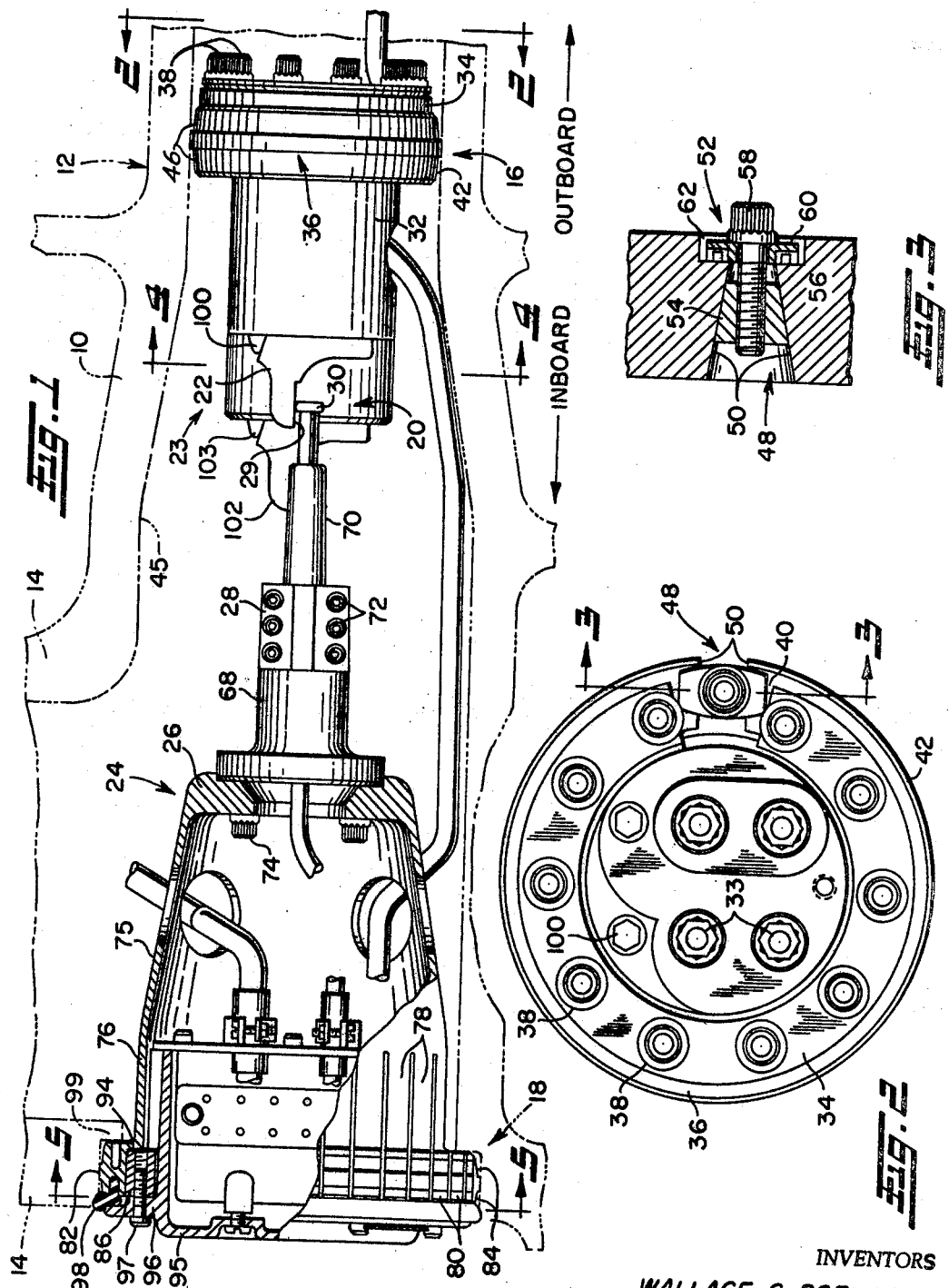

3,494,181
SENSING ASSEMBLY
Wallace G. Boelkins and Judd F. Garrison, Grand Rapids, Mich., assignors to Pneumo Dynamics Corporation, Cleveland, Ohio, a corporation of Delaware
Filed Dec. 11, 1967, Ser. No. 689,723
Int. Cl. G01m 1/12; G01l 3/00
U.S. Cl. 73—88.5
2 Claims

ABSTRACT OF THE DISCLOSURE

Apparatus for the mounting and locking of sensing apparatus for instrumentation, primarily within hollow axle housings, consisting of a split ring adapter having a stepped and tapered abutment surface expandable by a wedge block arrangement, and secured in position by an epoxy adhesive.

---

This invention relates to sensing instruments for use within hollow axle assemblies and more particularly to an instrumentation device for sensing the relative deflection between spaced locations in an aircraft landing gear axle.

The interior of an aircraft axle housing is usually a convenient area for performing measurements of the effects of, for example, the aircraft's weight or landing transitions upon the structural members of the landing gear. These parameters are often useful not only in the design and testing of various types of landing gear, but also in commercial installations where continuous measurements of landing gear characteristics and in particular landing gear deflection are to be monitored. The interior of the axle housing provides an area where a great extent of the axle structure may be accessible to the measuring instruments and, in addition, provides a protective enclosure which may also be sealed against contaminants.

This embodiment of the invention relates to the measurement of the deflection of various portions of the axle of the landing gear assembly which necessitates that the measuring instruments accurately monitor such deflection and in certain instances transmit this deflection to a common location for relative measurement purposes by a single instrument.

Due to the environmental conditions of a typical aircraft landing gear which is subject to high shock forces and vibrational levels, it is necessary that the instrumentation apparatus be relatively rigid and sturdy in order to accurately sense the desired measured parameter. On the other hand, it is usually desired that such measurements take place at discrete positions along the axle of the aircraft which necessitates mounting the apparatus in a relatively confined zone within the axle. In the past it has been difficult to achieve both these ends and therefore, it is an object of this invention to provide improved sensing apparatus which is relatively sturdy in structure and exhibits improved definition in monitoring at discrete locations along the axle.

It is another object of this invention to provide improved sensing apparatus exhibiting a unique manner of clamping the apparatus within the interior of an axle housing.

It is still another object of this invention to provide improved sensing apparatus which employs a combination of an adhesive bond with frictional contact at the mounting surface.

It is a further object of this invention to provide improved instrumentation apparatus which may be mounted in the interior of an axle housing through the inboard and outboard apertures of the housing and which is readily accessible to technical personnel for mounting or adjustment and maintenance purposes.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an elevational view partly in cross-section of the sensing apparatus of the invention within a typical cantilever type aircraft landing gear, showing different embodiments of the invention at the inboard and outboard locations of the axle;

FIG. 2 is an end view of the first embodiment of the apparatus of the invention taken from the outboard side along the lines 2—2 of FIG. 1;

FIG. 3 is a cross-sectional view of the wedge lock mechanism of the first embodiment of the invention taken along the lines 3—3 of FIG. 2;

FIG. 4 is an end view of the first embodiment of the apparatus of the invention taken from the inboard side along the lines 4—4 of FIG. 1;

FIG. 5 is an end view partly in cross-section of the mounting apparatus of the second embodiment of the invention taken from the inboard side along the lines 5—5 of FIG. 1; and FIG. 6 is a cross-sectional view of the wedge lock mechanism of the second embodiment of the invention taken along the lines 6—6 of FIG. 5.

Referring now to FIG. 1, there is shown in phantom lines the outline configuration of a portion of the cantilever type axle 10 of a typical aircraft landing gear. Such landing gear would have a wheel and braking system mounted on the outboard section 12 or right end portion of the axle 10 as viewed in FIG. 1 while the vertically extending portions 14 of the axle 10 are a part of the strut of the landing gear assembly which supports the aircraft. For certain measurement techniques it is desirable to sense the actual displacement of portions of the landing gear axle 10 and measure these displacements in relation to some reference point. In this embodiment of the invention, two locations 16, 18 of the axle 10 are selected and the measurement is performed by translating the displacement of these portions 16, 18 of the axle to a common point 20 where instrumentation can sense the relative displacement.

A preload member 22 is shown supported in a preload assembly 23 mounted in the outboard portion 12 of the axle 10 for translating the displacement of the first point of measurement 16 to the common instrumentation point 20. A sensor assembly 24 consisting of a sensor adapter 26 and instrumented sensor bar 28 is affixed at the second point of measurement 18 for translating the displacement of that point to the common point of measurement 20. The relative deflections between the first 16 and second 18 points of measurement will cause deflection of the sensor bar 28 which may then be detected by suitable instrumentation such as, for example, strain gauges and which may be monitored at a remote location.

The preload assembly 23 is utilized in this measurement technique to apply an initial deflection to a portion of the sensor bar 28 so that under normal loading conditions the force upon the sensor bar will be relieved. This prevents excessive deflection of the sensor bar or the production of excessive forces through the mounting assemblies.

The first embodiment of this invention is situated in the outboard portion 12 of the axle 10 of the aircraft, the axle being essentially circular in cross-section. The preload assembly 23 consists of a rigid preload member 22 exhibiting a horizontal flat surface 29 for cooperation with the spherical tip 30 of the sensor bar 28 of the sensor assembly 24. The preload member 22 is slidably mounted and clamped to a preload adapter 32 by bolts 33. The adapter 32 is essentially cylindrical in configuration and is retained at its outboard end within a radially outwardly extending and partially circular mounting flange 34. The flange 34, in turn, is mounted within a ring assembly 36 by a plurality of bolts 38.

The ring assembly 36 consists of a split ring arrangement having a radially inwardly extending flange 40 with a plurality of circumferentially spaced tapped holes 37 therein for cooperation with the mounting bolts 38, and a generally axially extending portion 42 adjacent the interior surface 45 of the axle 10 for securing the preload assembly 23 in location at the desired point of measurement 16. The axial portion 42 of the ring assembly 36 includes a central band 44 of greater diameter than the remainder of the axial portion 42 to provide a metal-to-metal contact with the interior surface 45 of the axle 10. The remainder of the axial portion 42 of the ring assembly 36 thus is spaced a small distance from the interior surface 45 of the axle 10 and provides recessed areas 46 on either side of the central band 44 for placement of adhesive materials for securing the preload assembly 23 in location.

The axial portion 42 forming the recessed areas 46 is tapered on either side of the central band 44 so that there is a clearance from the interior surface 45 of approximately .005 inch adjacent the central band 44, to a maximum of approximately .050 inch at either end of the axial portion 42. It has been determined that the combination of an epoxy type adhesive in the recessed areas 46 and the frictional contact of the band 44 with the axle housing 10, as described in detail hereinafter, provides an improved mounting arrangement for the sensor assembly 23.

The ring assembly 36 is essentially of circular configuration having a gap 48 at one portion, however, to provide an expandable clamping arrangement. As seen more clearly in FIG. 3, the two ends 50 of the ring assembly 36 forming the gap 48 are angled in an axial direction so that the gap 48 is tapered and has the narrower end disposed toward the outboard or upper surface of the ring assembly 36 as viewed in FIG. 2. A wedge lock arrangement 52 is located in this tapered gap 48 and consists of a wedge block 54 having angled surfaces essentially matching those of the ends 50 of the ring assembly 36 and adapted to be drawn along the tapered gap 48 in an axial direction to expand the ring assembly 36 into locking engagement with the interior surface 45 of the axle 10. The wedge block 54 includes an axial tapped hole 56 therein for receiving a hexheaded bolt 58 which is located by a retainer plate 60 positioned in a recess 62 in the ring assembly 36. The retainer plate 60 includes a central aperture therein in which the bolt 58 is located, and the underside of the head of the bolt 58, abuts against the retainer plate 60. The retainer plate 60 in turn, abuts against the surfaces of the flange 40 of the ring assembly 36 so that the ring assembly 36 is expanded when the bolt 58 is tightened to draw the wedge block 54 toward the narrow end of the tapered gap 48.

In mounting the preload assembly 36 within the interior of the axle 10, the complete assembly is inserted through the outboard aperture of the axle 10 until the ring assembly 36 is adjacent the desired location within the axle and the flat surface 29 of the preload member 22 is adjacent the tip 30 of the sensor bar 28. By tightening the wedge lock bolt 58, the ring assembly 36 may be expanded so that the stepped central band 44 of the axial portion 42 of the ring assembly 36 is firmly abutted against the interior surface 45 of the axle 10. The preload assembly 23 is retained in place by the pressure of expansion of the ring assembly 36 and adhesive material may be placed in the recessed areas 46 and cured therein to provide a secure attachment.

A second embodiment of the invention is shown in relation to the mounting for the sensor assembly 24 positioned at the inboard side of the axle 10, shown in partial elevational and cross-sectional views on the left hand side of FIG. 1 and in FIGS. 5 and 6. The sensor bar 28 consists of two portions, the first being the sensor bar mount 68 and the second the deflection bar 70 which is rigidly clamped into a socket in the mount 68 by bolts 72. The sensor bar mount 68 in turn is rigidly mounted to a sensor adapter 26 by a plurality of bolts 74. The sensor adapter 26 consists of a generally tubular housing closed and bored at the outboard end for receipt of the sensor bar 28 and having a tapered section 75 and an axially extending section 76 which is axially slotted to form a plurality of rigid fingers 78. The inboard end of the fingers 78 culminate in shoes 80 having an axial surface similar to the axial portion 42 of the ring assembly 36 of the first embodiment of the invention. The surface of the shoes 80 includes a stepped central portion of slightly greater dimension than the remainder of the axial surface which again provides a narrow abutment band 82 of approximately 0.2 inch and recessed tapered portions 84 on either side of the central band 82. The interior surface of the fingers 78 is recessed, as formed by the shoes 80, to provide an area in which a split ring 86 is located.

The gap 88 in the split ring 86 is again angled in an axial direction and a wedge block 90, bolt 91 and keeper plate 92 are arranged to cooperate therein in a manner similar to that described in the first embodiment. The split ring 86 is retained in position by adhesively bonding its outer surface to the recessed inner surface of the fingers 78 and further includes a plurality of tapped holes 94 circumferentially spaced about the ring 86 for mounting of a terminal box assembly 95.

The terminal box assembly 95 consists of a sealed enclosure essentially cylindrical in shape, having a mounting flange 96 near the inboard side, the assembly 96 being retained in place by a plurality of bolts 97. A ring-like gasket 98 is adapted to be positioned between the flange 96 of the terminal box assembly 95 and cooperating surfaces in the shoes 80 of the flexible fingers 78 and a chamfered portion of the housing of the axle 10 for preventing the entrance of contaminants within the interior of the axle 10.

Thus, mounting of the sensor assembly 24 is similar to that for the preload assembly 23 except that the sensor assembly 24 is inserted through an inboard aperture of the axle 10 until abutment is made with a stepped portion 99 of the interior 45 of the axle 10, and the wedge lock mechanism 90–92 is tightened to expand the split ring 86 thereby forcing the fingers 78 radially outwardly to cause the stepped central band 82 of the shoes 80 to come into abutment with the interior of the axle 10. The force of the wedge action retains the sensor assembly 24 in a rigid mounting configuration and additionally, as is often done in actual practice, the wedge block 90, tightening bolt 91 and retainer are bonded adhesively in position after expansion of the split ring 86 when the sensor assembly 24 is in the desired position.

An epoxy adhesive is utilized to retain the sensor and preload assemblies 24, 23 in their respective positions within the axle 10. The recessed areas 84, 46 on either side of the abutting bands 82, 44 respectively, provide a preferred configuration for an adhesive joint at the interfaces which then aids the frictional mount provided by bands 82, 44. The adhesive material is sufficiently resilient so as not to substantially affect the quality of indications of axle deflections and the like received at a narrow portion of the axle 10, through the metal-to-metal contact of the abutting bands 82, 44 and which is transmitted to the point of measurement 20. However, since the axle 10 is subject to localized deformation as well as linear deflections, the epoxy bond is advantageous in preventing axial shifting of the assemblies 23, 24 which could adversely affect the desired measurement. Further, such mounting arrangement avoids setting up excessive local stresses and subsequent undependable conditions in the axle which cannot be tolerated in this critical location of the aircraft.

The second embodiment of the invention described in relation to the sensor assembly 24 and including the fingers 78 is particularly advantageous in allowing the sensor adapter 75 to conform to the shape of the axle 10 in the particular mounting location and allows a certain amount of flexibility to accommodate axle distortions within the axle elastic limit without permanently distorting the sensor adapter 75. These ends are attained while still providing a direct and joint free route of axle movement to the tip 30 of the sensor bar 28.

It is seen that access to the sensor and preload assemblies 24, 23 may be readily obtained through the inboard and outboard apertures of the axle 10. Thus, for example, the preload member 22 may be shifted in position in relation to the ring assembly 36 by loosening the bolts 33 and adjusting a preload bolt 100 having a tapered tip which cooperates with a tapered surface on the preload member 22 to vary the quantity of preload force for the initial deflection of the sensor bar 28. In a similar manner, access may be gained to the electrical connections within the terminal box 95 by removing the cover of the box at the inboard aperture of the axle 10, without disrupting the mounting arrangement for the sensor assembly 24.

It will be appreciated from FIG. 1 which is drawn approximately to scale, and with the realization that a typical axle of an aircraft may be on the order of several feet in length, and that deflections taken at the point of measurement 20 may be on the order of thousandths of an inch, that the apparatus of the invention has provided a rigid, sturdy structure which is capable of transmitting displacement of instantaneous portions of an axle reliably and consistently to a common point. Thus, in the sensor assembly 24, although the sensor adapter 26 is somewhat radially flexible at its inboard end to accommodate clamping of the assembly 24 to the interior of axle 10 and axle deformations, linear deflection of the complete assembly 24 is minimal and the conditions occurring at the point 18 along the axle 10 are faithfully transmitted to the tip 30 of the deflection bar 70. Even though radial accommodations occur at the inboard end of the sensor adapter 26, the relative vertical or horizontal position of the sensor bar 28 remains unchanged and no initial adjustment need be made between the sensor bar 28 and the sensor adapter 26 other than to bias the sensor bar 28 with a desired preload force.

Although only a single sensor bar 28 and preload member 22 have been described, it is apparent that a plurality of these combinations may be employed in a single axle 10 using common mounts 23, 24. Thus in FIGS. 1 and 2, a second preload member 102 and preload bolt 103 is shown displaced transversely of the first described, but mounted in the same ring assembly 36. Similarly, a second sensor bar arrangement is mounted in the sensor adapter 75 to cooperate with the preload member 102 and perform a second measurement of the axle deflection at the common mounting points 16, 18. It will be apparent that the teachings of this invention are applicable as well to such plural measurement techniques.

Other modes of applying the principle of the invention may be employed, change being made as regards the details described, provided the features stated in any of the following claims or the equivalent of such be employed.

We, therefore, particularly point out and distinctly claim as our invention:

1. Apparatus for mounting a sensor assembly within a hollow tubular member of an aircraft landing gear and the like, comprising a support for the assembly having a cylindrical end portion which is slotted to form a plurality of axially extending and radially flexible fingers, with the outer surfaces of said fingers shaped to define a circumferentially interrupted narrow cylindrical band for limited engagement with the interior surface of the tubular member, a split ring having axially converging surfaces at its gap disposed within the slotted end portion of the support, a cooperable wedge positioned in the ring gap, means for axially moving the wedge in the gap to expand the ring and thereby force the fingers of the support outwardly into locking engagement with the tubular member, and a sensor assembly fixedly mounted on the support.

2. Apparatus as set forth in claim 1, wherein the outer surfaces of the fingers define with the interior surface of the tubular member a recess contiguous to said band for containing adhesive to bond the fingers to the tubular member.

References Cited

UNITED STATES PATENTS

| | | | |
|---|---|---|---|
| 2,544,738 | 3/1951 | Tint | 73—133 |
| 3,166,363 | 1/1965 | Kay | 308—207 |
| 3,184,964 | 5/1965 | Hedrick et al. | 73—141 |
| 3,273,382 | 9/1966 | Fonash | 73—88.5 |
| 3,327,270 | 6/1967 | Garrison | 338—2 |
| 3,376,537 | 4/1968 | Pugnaire | 338—5 |

RICHARD C. QUEISSER, Primary Examiner

J. WHALEN, Assistant Examiner

U.S. Cl. X.R.

73—65, 133; 177—136